United States Patent [19]
Li et al.

[11] Patent Number: 5,936,373
[45] Date of Patent: Aug. 10, 1999

[54] WIDE POLE SWITCHED RELUCTANCE MACHINE AND METHOD OF ITS CONTROL

[75] Inventors: Yue Li, St. Louis, Mo.; James Skinner, Princeton, Ind.

[73] Assignee: Emerson Electric Co., St. Louis, Mich.

[21] Appl. No.: 08/937,831

[22] Filed: Sep. 26, 1997

[51] Int. Cl.⁶ .............................. H02P 8/00; H02K 19/10
[52] U.S. Cl. ......................... 318/701; 310/166; 310/168
[58] Field of Search .................................. 310/162, 165, 310/166, 168, 173; 318/701

[56] References Cited

U.S. PATENT DOCUMENTS

| | | | |
|---|---|---|---|
| 5,289,107 | 2/1994 | Radun et al. | 322/94 |
| 5,315,224 | 5/1994 | Zellman | 318/701 |
| 5,545,938 | 8/1996 | Mecrow | 310/156 |

OTHER PUBLICATIONS

Jack, AG, Mecrow, DC & Hayloc, J, "A Comparative Study of Permanent MAgnet and Switched Reluctance Motors for High Performance Fault Tolerant Applications," Proc. IAS 95, Orlando, Florida, Oct. 8–12, 1995, vol. 1, pp. 734–740.

Barrass, PG, Mecrow, BC & Clothier, AC, "Bipolar Operation of Fully–Pitched Winding Switched Reluctance Drives," IEE Proc. Electrical Machines & Drives Conference, Durham, North Carolina, Sep. 11–13, 1995, Pub. No. 412, pp. 252–256.

Jack, AG & Mecrow, DC, "Safety Critical Drives for Aerospace Applications," Proc. ICEM 94, Paris, Sep. 5–8, 1994, vol. 1, pp. 91–96.

Husain, Iqbal and Ehsani, Mehrdad, "Rotor Position Sensing in Switched Reluctance Motor Drives by Measuring Mutually Induced Voltages," IEEE Transactions on Industry Applications, vol. 30, No. 3, May/Jun. 1994, pp. 665–671.

Arkadan, AA & Kielgas, BE, "Switched Reluctance Motor Drive Systems Dynamic Performance Prediction and Experimental Verification," IEEE Trans on Energy Conversion, Mar. 1994, vol. 9, No. 1, pp. 36–44.

Dunlop, G., "A Switched–Reluctance Motor Drive with Zero Torque Ripple and a Constant Inverter Bus Current," Proc. Inst. Mech. Eng. Journal System Control Engineering, 1994, vol. 208, No. 1, Part 1, pp. 61–68.

Mecrow, BC, "New Winding Configurations For Doubly Salient Reluctance Machines," Proc IAS 92, Houston, Texas, Oct. 4–9, 1992, vol. 1, pp. 249–256.

Hava, A; Blasko, V; & Lipo, TA, "A Modified C–Dump Converter for Variable Reluctance Machines," IEEE Trans on Ind. Appl, Sep./Oct. 1992, vol. 28, No. 5, pp. 1017–1022.

Arkadan, AA & Kielgas, BD, "Computer–Aided Modeling and Parameters Determination of Switched Reluctance Motor Drives Using Finite Element Analysis," Conf. Proc. of Southcon 92, Orlando, Florida, Mar. 1992, pp. 94–99.

Hava, A; Blasko, V; & Lipo TA, "A Modified C–Dump Converter for Variable Reluctance Machines," IEEE IAS Conference, Dearborn, Michigan, Sep. 30–Oct. 4, 1991, pp. 886–891.

Egan, MG; Harrington, MB & Murphy, JMD, "PWM–Based Position Sensorless Control of Variable Reluctance Motor Drives," EPE Conference, Florence, Sep. 1991, vol. 4, pp. 024–029.

Materu, P, Krishnan, R and Farzanehfard, H, "Steady state analysis of the Variable Speed Switched Reluctance Motor Drive," IEEE Con, 1987,;;. 294–302.

Lawrenson, PJ; Stephenson, JM; Fulton, NN, "Switched Reluctance Motors for Traction Drives," IEE Proc B Elect. Power Applications, UK, Jul. 1980, vol. 127, No. 4, pp. 246–252.

*Primary Examiner*—Nestor Ramirez
*Assistant Examiner*—B. Mullins
*Attorney, Agent, or Firm*—Arnold White & Durkee

[57] ABSTRACT

This invention provides a novel switched reluctance machine and a method of its control. The machine rotor has rotor poles that are wider than the stator pole, which allows two phases to be energized simultaneously, reducing torque ripple and noise.

24 Claims, 14 Drawing Sheets

WIDE POLE SWITCHED RELUCTANCE MACHINE AND METHOD OF ITS CONTROL

FIELD OF THE INVENTION

This invention relates in general to reluctance machines and machine systems and, in particular, to switched reluctance machines and machine systems. Specifically, the invention relates to a novel switched reluctance machine design having using wide rotor poles and overlapping phase currents to drive the rotor.

BACKGROUND OF THE INVENTION

Reluctance machines are well known in the art. In general, a reluctance machine is an electric machine in which torque is produced by the tendency of a movable part to move to a position where the inductance of an excited winding is maximized (i.e., the reluctance is minimized).

In one type of reluctance machine, the phase windings are energized at a controlled frequency. This type of reluctance machine is generally referred to as a synchronous reluctance machine. In another type of reluctance machine, circuitry is provided to determine the position of the machine's rotor, and the windings of a phase are energized as a function of rotor position. This type of reluctance machine is generally referred to as a switched reluctance machine. Although the description of the current invention is in the context of a switched reluctance machine, the present invention is applicable to all forms of reluctance machines, including synchronous and switched reluctance motors and to other machines that have phase winding arrangements similar to those of switched reluctance machines.

The general theory of design and operation of switched reluctance machines is well known and discussed, for example, in *The Characteristics, Design and Applications of Switched Reluctance Motors and Drives,* by Stephenson and Blake and presented at the PCIM '93 Conference and Exhibition at Nüremberg, Germany, Jun. 21–24, 1993.

Typical known reluctance machines include a stator, a rotor rotatably mounted with respect to the stator, where the stator defines a plurality of phase windings. In most known motors, each phase winding comprises a plurality of electrically conductive coils of wire (e.g., copper), and each coil of wire is wound about a different stator pole. FIG. 1 generally illustrates a conventional reluctance machine 10 having a rotor 12 defining four rotor poles and a stator 14 that defines six stator poles. For purposes of illustration, the stator poles are divided into three stator pole pairs 13A, 13B and 13C, with each pole pair comprising two opposing stator poles. Wound about the stator poles are three phase windings A, B and C where each phase winding comprises two coils and where the coils of phase winding A are wound around the poles of stator pole pair 13A, the coils of phase winding B are wound around the stator poles in group 13B, and the coils of phase C are wound around the stator poles in group 13C.

When one of the phase windings A, B and C is energized by establishing electric current in the phase winding, the stator poles associated with that phase winding (e.g., stator pole group 13A for phase A) will be excited and become electromagnets. In machine 10, as in most known conventional machines, each energizing coil is placed immediately adjacent the sides of the stator pole the coil is intended to excite. For example, coil 16 is wound about, and intended to excite, stator pole 15. Thus, the two side turn portions 16a and 16b of coil 16 are positioned immediately adjacent the sides of stator coil 15. In a similar manner, each of the other coils of machine 10 is positioned immediately adjacent to the stator pole it is intended to excite.

The basic mechanism for torque production in a reluctance motor is the tendency of the rotor to move into a position to increase the inductance and minimize the reluctance of the energized phase winding. This position of maximum inductance and minimum reluctance occurs when the pair of rotor poles are pulled into alignment with the excited pair of stator poles. In general, the magnitude of the torque produced by this mechanism corresponds to the magnitude of the current in the energized phase winding. For an ideal motor with no magnetic saturation, the instantaneous torque T is:

$$T = 1/2 i^2 \frac{dL}{d\theta}$$

Where i is the instantaneous current in the energized phase winding and $$dL/d\theta$$

is the derivative of the phase self inductance L with respect to the rotor position θ. In other words, the torque is proportional to the square of the current and to the angular rate of change of the phase self inductance. While all practical reluctance motors have some magnetic saturation this equation is useful for purposes of the present analysis.

Reluctance torque is developed in a reluctance machine by energizing a pair of stator poles when a pair of rotor poles is in a position of misalignment with the energized stator poles. The degree of misalignment between the stator poles and the rotor poles is called the phase angle. As the pair of rotor poles approach the aligned position, inductance increases until the rotor poles align with the excited pair of stator poles. This is the maximum inductance level. While the inductance is increasing, torque is positive, since $$dL/d\theta$$

is positive. As the rotor pole rotates past the excited stator pole, inductance begins to decrease, making $$dL/d\theta$$

negative, which means that a negative, or breaking torque is produced. To prevent this breaking effect on the rotor, at a certain phase angle in the rotation of the rotor poles to the position of maximum inductance, but before the position of maximum inductance is achieved, the current is removed from the phase, de-energizing the stator poles. Subsequently, or simultaneously, a second phase is energized. If the second phase is energized when the inductance between the second pair of stator poles and the rotor poles is increasing, positive torque is maintained and the rotation continues. Continuous rotation is developed by energizing and de-energizing the stator poles in this fashion. The total torque of an reluctance machine is the sum of the individual torques described above.

While conventional machines, like machine 10, have relatively high torque densities with respect to other forms of electric machines, the full potential of such machines is not fully realized. This is due to the above described pattern of energizing and de-energizing single stator pairs. In other words, in conventional machines, only one phase winding is energized at any given time. Thus, the entirety of the flux flow through the machine is steered through the stator poles that are excited by the energized phase winding.

FIG. 2 generally illustrates the main flow of flux that will be established when the phase A winding of machine 10 is energized. As illustrated, at such a time the coils surrounding stator poles 15 and 17 are energized such that stator poles 15 and 17 are excited the flux flow is "steered" through these excited poles. As FIG. 2 illustrates, the main flow of flux through machine 10 as energized in FIG. 2 is from excited stator pole 17, across the air-gap, through the rotor 12, across the air-gap, through stator pole 15 and through the stator back-iron (or yoke) back to excited stator pole 17. This main flux flow is reflected by the flux path 20a and 20b. Because this main flux path crosses through the air-gap and passes through the rotor, it tends to produce torque and thus provides a path for the main torque-producing flux.

From an analysis of FIG. 2, it may be noted that when only one phase winding is energized, only the excited stator poles are used for torque production. The unexcited stator poles adjacent the excited pole, e.g., poles 18a and 18b, are not used in torque production and are magnetically and electrically idle. Accordingly, in conventional machines like machine 10 of FIG. 2, at each instant of operation, there is a large amount of active material (e.g., stator iron) that is not fully utilized for torque production.

Further, since only one phase is energized at a time in a traditional switched reluctance machine, the torque developed by the machine is not smooth. Torque drops off steeply when the phase angle of the rotor is between the poles of the stator, when the inductance is minimized, then increases as the phase angle of the rotor moves toward alignment with a stator pole, when inductance is maximized. This rising and falling torque phenomenon is known as "torque ripple."

In addition to the problem of torque ripple, known reluctance machines often produce undesirable noise and vibration. As the inductance of a reluctance machine increases and decreases, the magnetic flux in parts of the machine changes in relation to the increasing and decreasing inductance. As a typical reluctance machine's pair of rotor poles moves into a position of alignment with a pair of energized stator poles, radial lines of magnetic flux deform the shape of the rotor and stator poles, decreasing the separation space between the poles. The changing flux results in fluctuating magnetic forces being applied to the ferromagnetic parts of the machine. These forces can produce unwanted noise and vibration. One major mechanism by which these forces can create noise is the ovalizing of the stator caused by magnetic forces normal to the air-gap. Generally, as the magnetic flux increases along a given diameter of the stator, the stator is pulled into an oval shape by the magnetic forces. As the magnetic flux decreases, the stator pulls or springs back to its undistorted shape. This ovalizing and springing back of the stator will produce audible noise and can cause unwanted vibration.

In the past the problem of torque ripple has sometimes been addressed by modifying the motor control circuitry. As one example, by profiling the current in a phase during the active time period when the phase is energized, the rate of change in the magnetic flux can be controlled resulting in less abrupt changes in machine torque. Prior art attempts at reducing noise in switched reluctance machines include using stiffer materials for stator construction and manufacturing to very precise specifications. These attempted solutions result in higher design, manufacturing, and maintenance costs, thereby detracting from one of the switched reluctance machine's primary benefits, economy.

The present invention is directed to overcoming, or at least reducing the effects of, the problems set forth above. Other features of the present invention will be apparent to those skilled in the art having the benefit of this disclosure.

SUMMARY OF THE INVENTION

The present invention addresses the above shortcomings of the prior art. In accordance with one aspect of the present invention, there is provided a reluctance machine comprising a stator defining a plurality of stator poles, each stator pole defining an arc, a rotor defining a plurality of rotor poles, each rotor pole defining an arc which is larger than each of the stator pole arcs, the rotor being mounted for rotation with respect to the stator, and a controller for selectively energizing and de-energizing the stator poles. In a further embodiment, the controller energizes one phase winding with current having a first polarity, and energizes an adjacent phase winding with current having a polarity opposite the first polarity.

In accordance with another embodiment of the invention, the reluctance machine also defines a plurality of self inductance profiles corresponding to the plurality of phases, each self inductance profile including a period of increasing inductance, a period of substantially constant inductance, and a period of decreasing inductance, and the reluctance machine further defines a plurality of mutual inductance profiles resulting from the plurality of self inductance profiles, each mutual inductance profile including a period of increasing inductance and a period of decreasing inductance, wherein the mutual inductance profile period of increasing inductance coincides with the self inductance profile period of substantially constant inductance.

A method is provided in accordance with yet another embodiment of the invention comprising the acts of energizing a first one of the phase windings at a first angular position, energizing a second one of the phase windings at a second angular position which is defined by the first angular position plus an angular interval equal to the stator pole arc, and de-energizing the first one of the phase windings at a third angular position which is defined by the first angular position plus an angular interval equal to the rotor pole arc. In a further embodiment, the second one of the phase windings is energized with current having a polarity opposite the polarity of the current energizing the first one of the phase windings.

DESCRIPTION OF THE INVENTION

Figure 1:
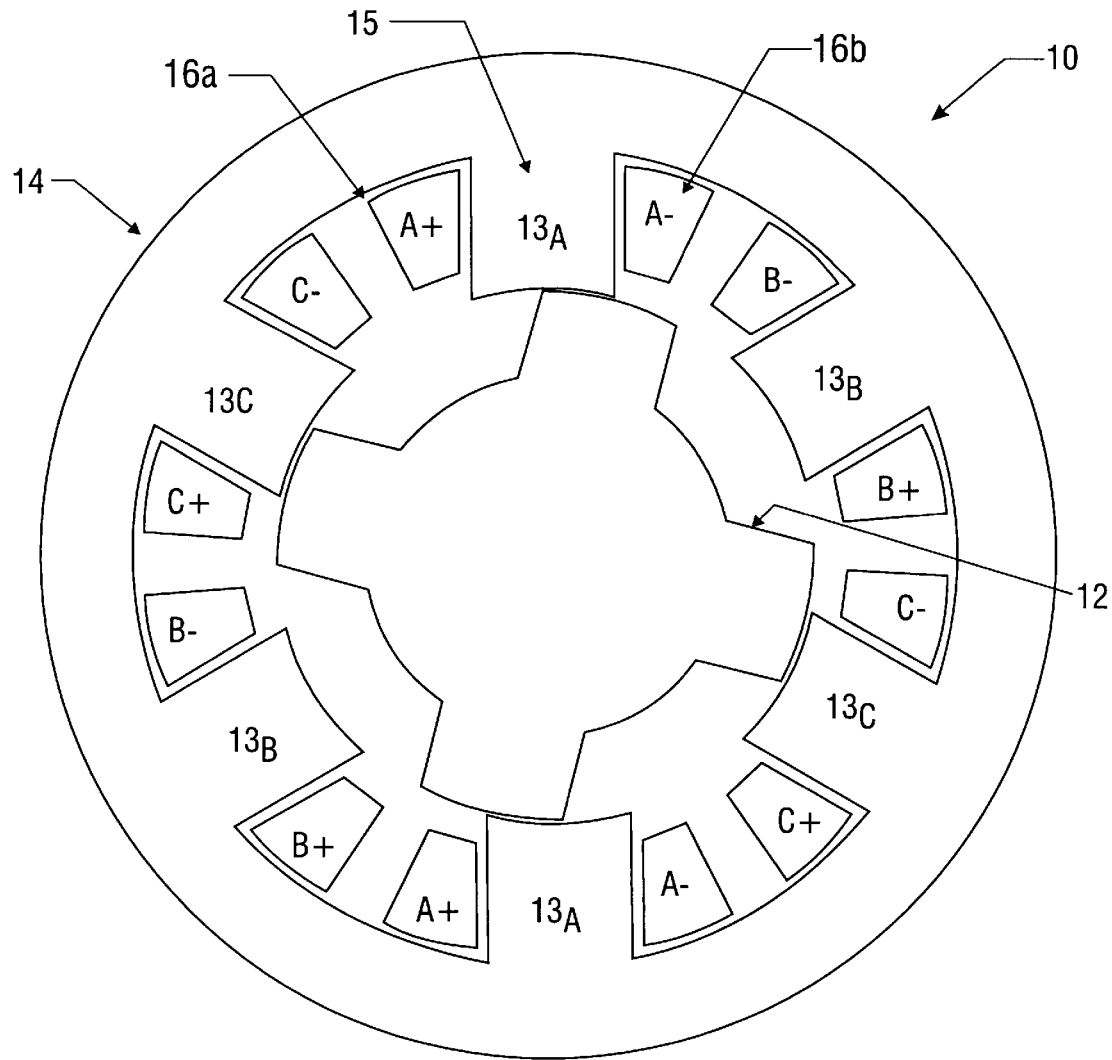
FIG. 1 displays a prior art switched reluctance machine.
Figure 2:
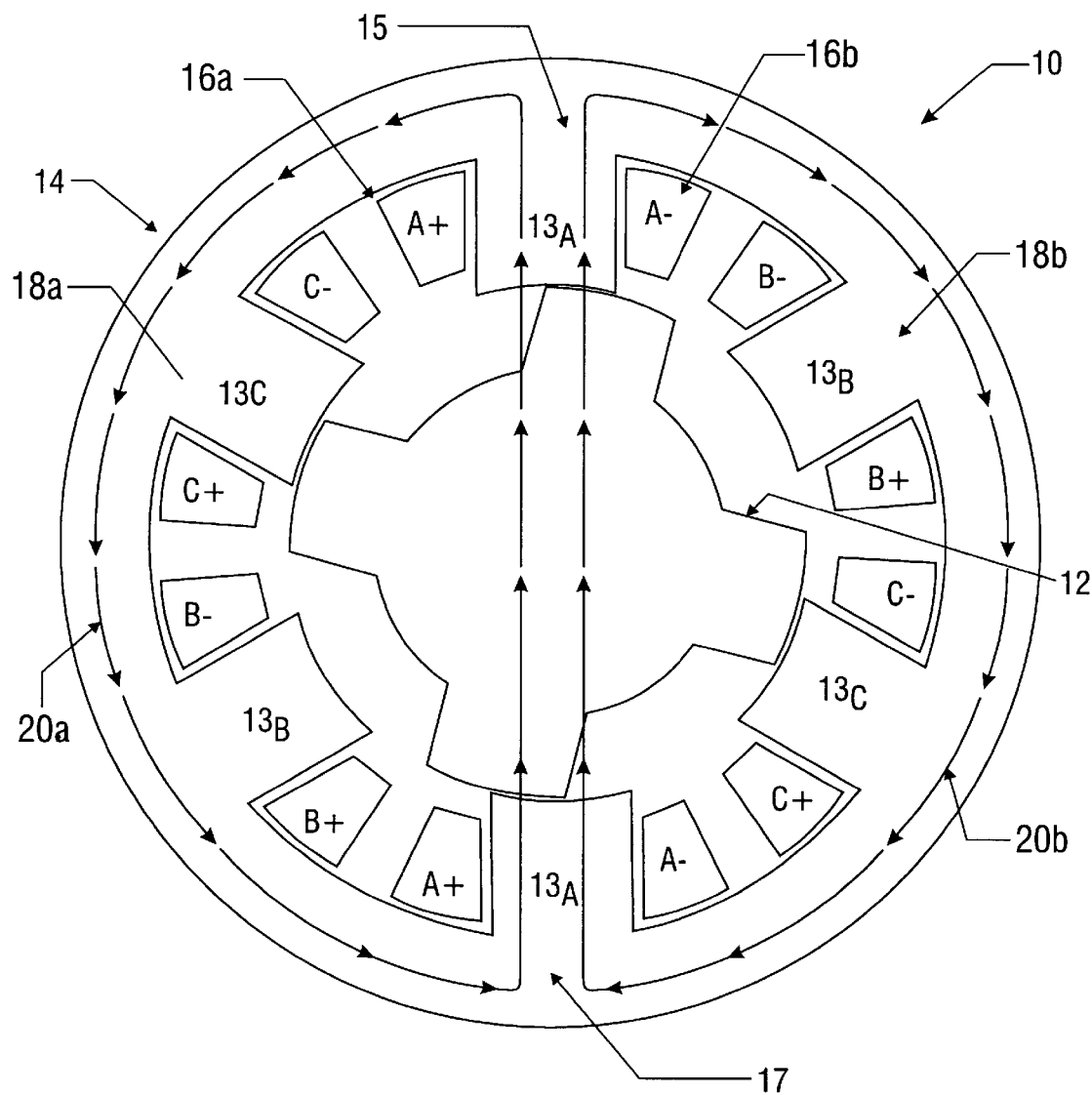
FIG. 2 displays the flux pattern set up in the prior art switched reluctance machine.
Figure 3:
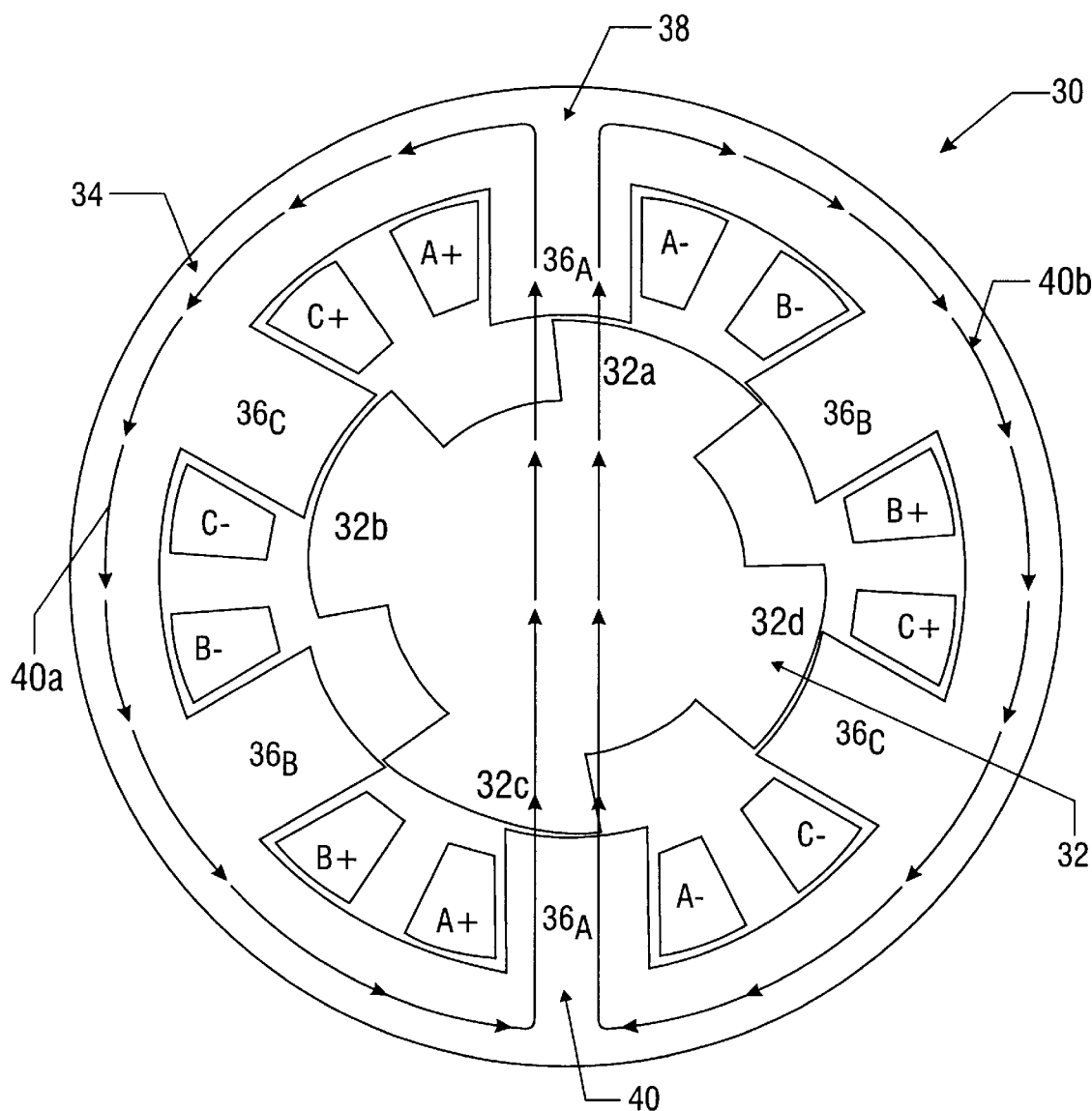
FIG. 3 illustrates an exemplary 6/4 3-phase switched reluctance machine constructed according to certain aspects of the present invention, having wide rotor poles and a single energized phase, and the flux pattern set up thereby.

Turning to the drawings and, in particular, to FIG. 3, a novel switched reluctance machine 30 is illustrated. The basic construction of machine 30 is similar to that of prior art switched reluctance machines. Machine 30 comprises a rotor 32 defining four rotor poles 32a, 32b, 32c and 32d, and a stator 34 defining six stator poles 36. However, as indicated in FIG. 3, each rotor pole of rotor 32 has an angular expanse that is wider than the angular expanse of each stator pole of stator 34. In prior art switched reluctance machines, such as the machine 10 illustrated in FIG. 1, the angular expanse of each rotor pole is generally equal to the angular expanse of each stator pole.

In the exemplary embodiment of FIG. 3, each stator pole defines an arc which is approximately 1.5 times larger than each rotor pole. In the machine 30 of FIG. 3, each stator pole defines a 30° arc, and each rotor pole defines a 45° arc. In FIG. 3, the main flux flow is shown for phase A alone energized, reflected by flux path 40a and 40b. The main flux flows from excited stator pole 42, across the air gap, through the rotor 32, across the air-gap, through excited stator pole 38 and through the stator back-iron (or yoke) back to excited stator pole 42. This flux flow will produce a torque on the rotor that will tend to align the poles of rotor 32 through which the flux passes with excited stator pole pair 36A.

For purposes of illustration, the stator poles are divided into three stator pole pairs 36A, 36B, and 36C, with each stator pole pair comprising two opposing stator poles. Wound about the stator poles are three phase windings A, B, and C where each phase winding comprises two coils and where the coils of phase winding A are wound around the poles of stator pole pair 36A, the coils of phase winding B are wound around the stator poles in group 36B, and the coils of phase C are wound around the stator poles in group 13C. The stator 34 is essentially a standard switched reluctance machine stator, so it may be formed from a stack of substantially identical laminations using conventional manufacturing techniques. Conventional manufacturing techniques may also be used to place the windings A, B and C within the stator.

To produce torque in a switched reluctance machine such as novel machine 30 illustrated in FIG. 3, one of the phase windings A, B, and C is energized by establishing electric current in the phase winding. For example, assume phase A, which comprises stator pole pair 36A, is energized. Since rotor poles 32a and 32c are not aligned with stator pole pair 36A, the rotor will move in a counterclockwise direction to align rotor poles 32a and 32c with energized stator pole pair 36A, which is the position of maximum inductance and minimum reluctance. Positive torque is produced because the phase A self inductance L is increasing as the rotor position changes, thus $$dL/d\theta$$

is positive as the rotor moves to the aligned position.

When rotor poles 32a and 32c align, or overlap stator pole pair 36A, phase A self inductance will be at a maximum level. In a conventional switched reluctance machine having rotor pole arcs that are approximately equal to the stator pole arcs, stator pole pair 36A would be de-energized at approximately this point, and the next phase, phase 36B would be energized. In other words, the phases in a three-phase conventional switched reluctance machine are energized in the following pattern: A, B, C, A . . . , such that only a single phase is energized at any given time.

However, in accordance with the present invention, each motor pole defines an arc that is larger than each stator pole arc. In the embodiment illustrated in FIG. 3, the rotor pole arc is approximately 45° and the stator pole arc is approximately 30° (the rotor poles are approximately 1.5 times wider than the stator poles). Thus, the angular difference between the rotor pole arc and the stator pole arc is 15°, so rotor poles 32a and 32c overlap stator pole 36A for an additional angular period of 15° as compared to a machine having approximately equal rotor and stator pole arcs. During this 15° angular period, self inductance is unchanged at its maximum value, so $$dL/d\theta$$

is 0. Therefore, no negative (or breaking) torque is produced during this period even though current is applied to the phase winding.

When rotor poles 32a and 32c become fully aligned with the phase A stator pole pair 36A, rotor poles 32b and 32d will begin to align with the phase B stator pole pair 36B. At this point, current is applied to the phase B winding in addition to the phase A winding, thereby energizing stator pole pair 36B simultaneously with stator pole pair 36A.

Figure 4:
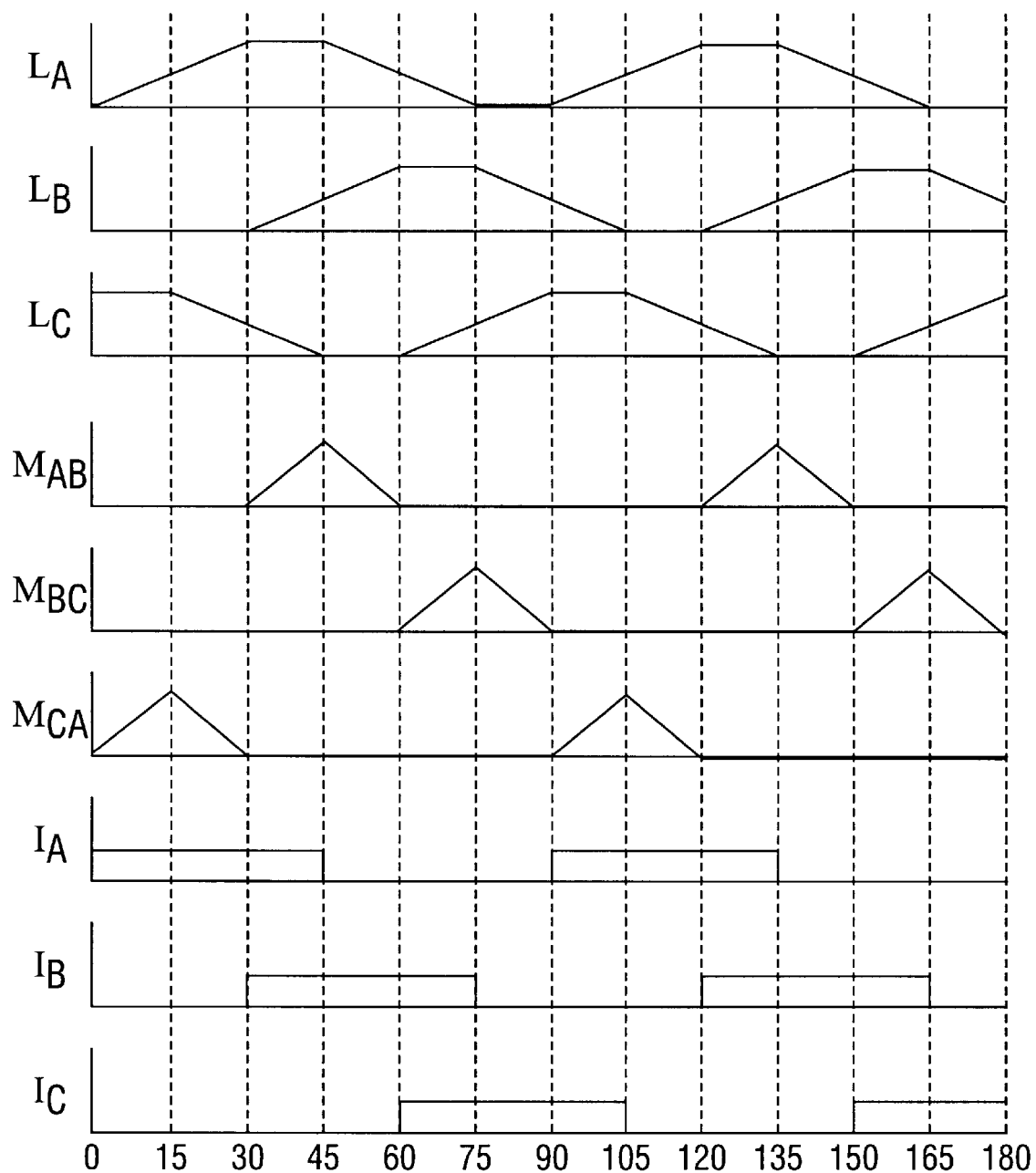
FIG. 4 illustrates wave forms for self-inductance, mutual inductance and current in phases A, B and C of a 6/4 3-phase switched reluctance machine constructed in accordance with the present invention.

The simultaneous phase excitation of phases A and B creates an additional flux flow path between the stator poles of phase A and phase B, thus producing mutual inductance between the simultaneously energized phases. FIG. 4 illustrates approximations of wave forms for phase self inductance, mutual inductance and phase current. As discussed above, self inductance torque for a single phase is calculated according to $$T = 1/2 i^2 \frac{dL}{d\theta}$$

During the angular period between 30° and 45° as illustrated in FIG. 4, $$dL/d\theta$$

is 0 for phase A and positive (self inductance is increasing) for phase B. Further, the mutual inductance between phase A and phase B adds an additional torque producing element. The mutual inductance torque component is as follows:

$$T_{mutual} = i_m i_n \frac{dM_{mn}}{d\theta}$$

where $i_m$=phase m current, $i_n$=phase n current, and $$dM_{mn}/d\theta$$

is the derivative of the mutual inductance M between phases m and n with respect to the rotor position θ.

Referring again to the angular period between 30° and 45° as illustrated in FIG. 4, the mutual inductance between phases A and B ($M_{AB}$) is increasing with respect to rotor position θ, and the phase current for both phase A and phase B is positive. Therefore, there is positive torque contribution in addition to the self inductance torque provided by energized phase B.

Phases A and B remain simultaneously excited for the 15° angular period where stator poles 32a and 32c overlap stator pole pair 36A. Prior to the point where rotor poles 32a and 32c cease to overlap stator pole pair 36A, phase A must be de-energized to avoid applying a negative torque to the rotor. When the rotor poles align with the phase B stator pole pair 36B, phase C will be energized simultaneously with phase B for a 15° angular period. This pattern of phase energization is repeated, resulting in a phase energization pattern of A, AB, B, BC, C, CA, A . . . that provides continuous, improved torque production.

Figure 5:
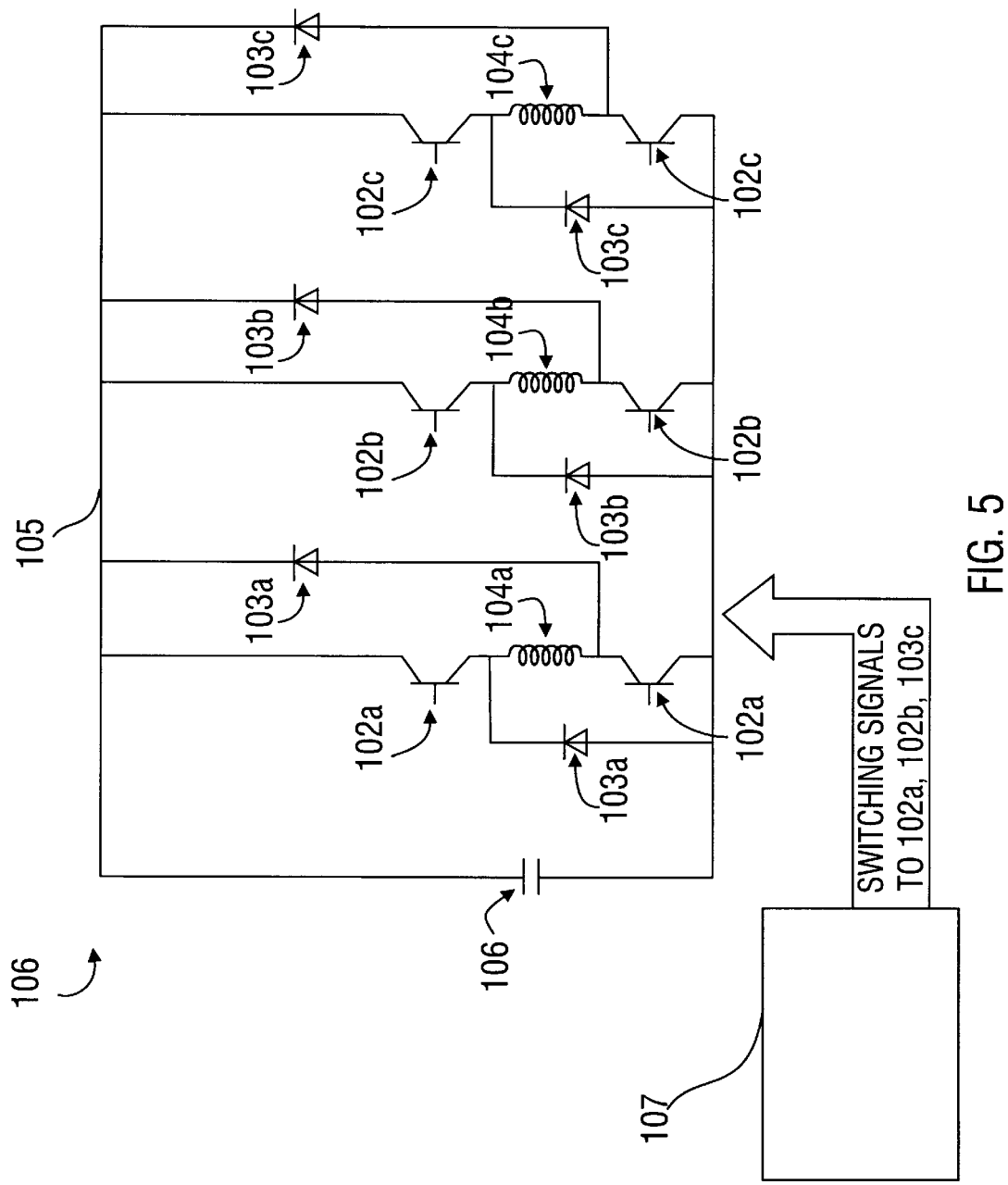
FIG. 5 illustrates a circuit diagram of an exemplary power converter which may be used to provide unipolar phase energization to the machine of the present invention.

FIG. 5 illustrates a circuit diagram for a power converter 100 which can be used to provide phase excitation for a machine in accordance with the present invention. The circuit 100 of FIG. 5 is described in conjunction with a three-phase machine such as that illustrated in FIG. 3, and includes two power switching devices 102a–102c and two antiparallel diodes 103a–103c coupled to each of the phase windings 104a–104c and the power converter's DC bus 105. In the power converter of FIG. 5, the DC bus is established across a DC capacitor 106.

Figure 6:
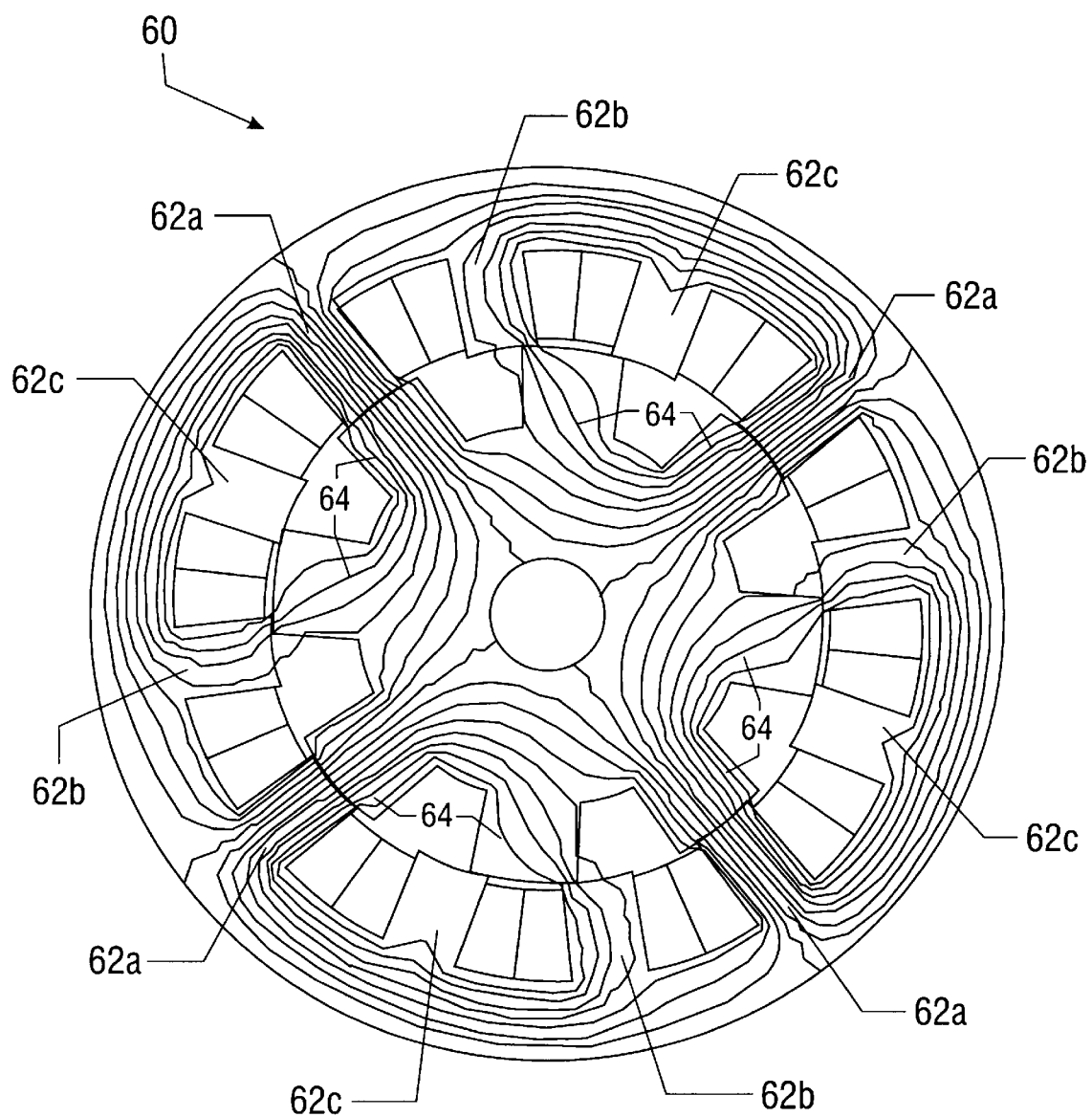
FIG. 6 illustrates a 12/8 3-phase switched reluctance machine constructed according to certain aspects of the present invention, showing a "long" flux path.

A switching circuit 107 is provided for detecting the position of the rotor with respect to the stator and energizing the phase windings as a function of the rotor's position. The switching circuit 107 functions as for a standard switched reluctance machine, except that it provides simultaneous excitation for two phases in the manner described herein above. The precise construction of switching circuit 107 will vary with the application of the system. It may be constructed using standard switching circuits known to those skilled in the relevant art with the benefit of this disclosure. The circuit illustrated FIG. 5 provides unipolar phase excitation current. In other words, the current applied to each phase winding is of the same polarity, as the current wave forms illustrate in FIG. 4. With phases A and B simultaneously energized using unipolar current, a flux flow pattern is created between stator poles of adjacent phases A and B in addition to the conventional flux flow path between stator pole pairs. FIG. 6 illustrates the flux pattern for a three-phase switched reluctance machine 60 having 12 stator poles 62 and 8 rotor poles 64, which define arcs larger than the arcs defined by the stator poles 62. The stator poles are additionally labeled with a suffix a, b or c to illustrate the respective machine phases. As shown in FIG. 6, a "long" flux path is established, with flux paths established between poles 62a of phase A and also between poles 62a and 62b of simultaneously energized phases A and B. The number of lines in the illustrated flux paths represents the flux density established. Since the poles 62a of phase A are fully aligned with respective stator poles 64, $$dL/d\theta$$

is 0 and thus, there is no positive torque contribution from phase A(there is also no negative torque). There is some mutual coupling between the poles of phase A and phase B creating some mutual inductance and in turn, contributing some positive mutual inductance torque.

Figure 7:
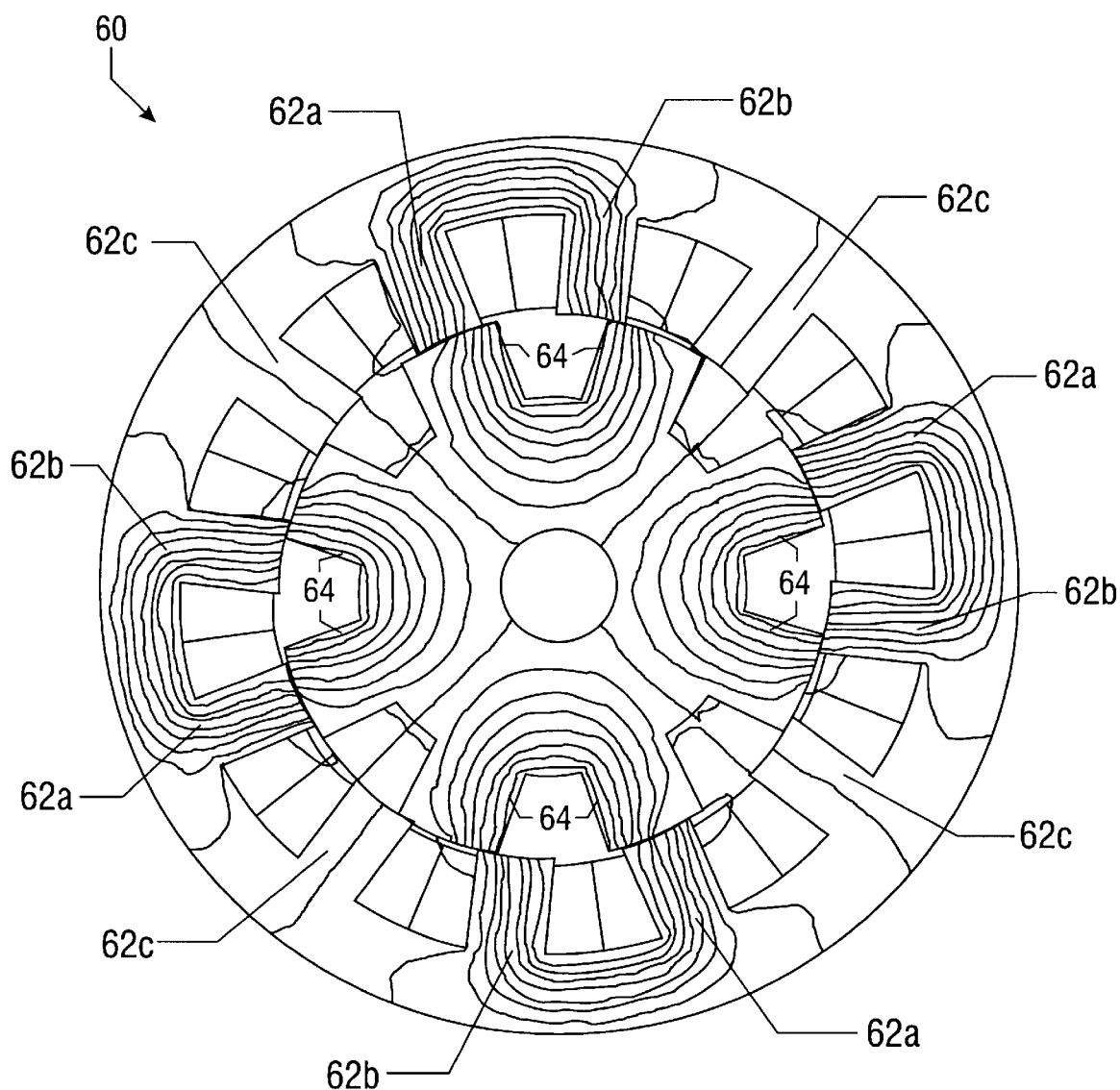
FIG. 7 illustrates a 12/8 3-phase switched reluctance machine constructed according to certain aspects of the present invention, showing a "short" flux path.

The mutual coupling can be substantially increased if adjacent phase windings are energized with current of opposite polarity. In other words, in a three-phase motor, if the polarity of the excitation current of phase B is reversed from that of phases A and C, a "short" path flux pattern similar to that illustrated in FIG. 7 is created. In FIG. 7, a machine 60 configured in the same manner as the machine illustrated in FIG. 6 has the poles 62a of phase A completely aligned with corresponding rotor poles 64 and the poles 62b of phase B partially aligned. In the machine 60 of FIG. 7, the polarity of the current in one of the excited phases is reversed: positive current is applied to the phase A windings and negative current is provided to the windings of phase B. This may be accomplished by using a circuit essentially identical to that illustrated in FIG. 5, but with the phase B winding 104b connections to the DC bus 105 reversed.

Figure 8:
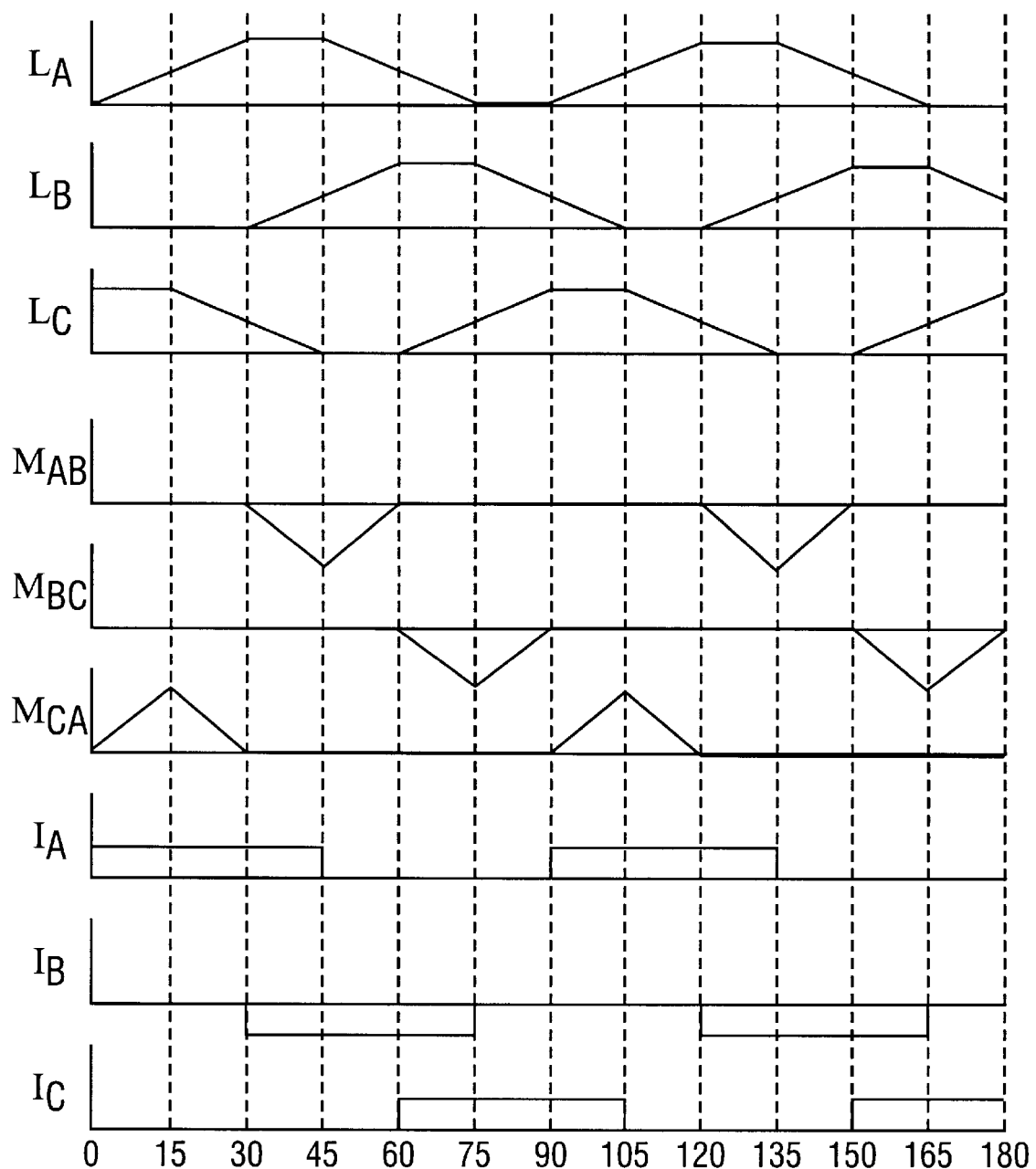
FIG. 8 illustrates wave forms for self-inductance, mutual inductance and current in phases A, B and C of a 6/4 3-phase switched reluctance machine constructed in accordance with the present invention with positive current applied to phases A and C and negative current applied to phase B.

Wave forms for self inductance, mutual inductance and current for a machine having phase B excitation current opposite in polarity of phases A and C is illustrated in FIG. 8. As seen in FIG. 7, the main flux path is established between adjacent poles of phase A and B. The mutual inductance is greatly increased from the "long" flux path shown in FIG. 6, providing greater mutual inductance torque production while using an essentially conventional power converter circuit.

In the three phase motor, the short flux path is only developed when adjacent phase windings are energized with opposite-polarity current. Thus, with a three phase machine using positive current to energize phase A and phase C, and negative current to energize phase B, a short flux path is not created when phase C and phase A are simultaneously energized. This is still an improvement over known switched reluctance machines, reducing noise and vibration and providing smoother torque transition for two-thirds of the machine phases.

Figure 9:
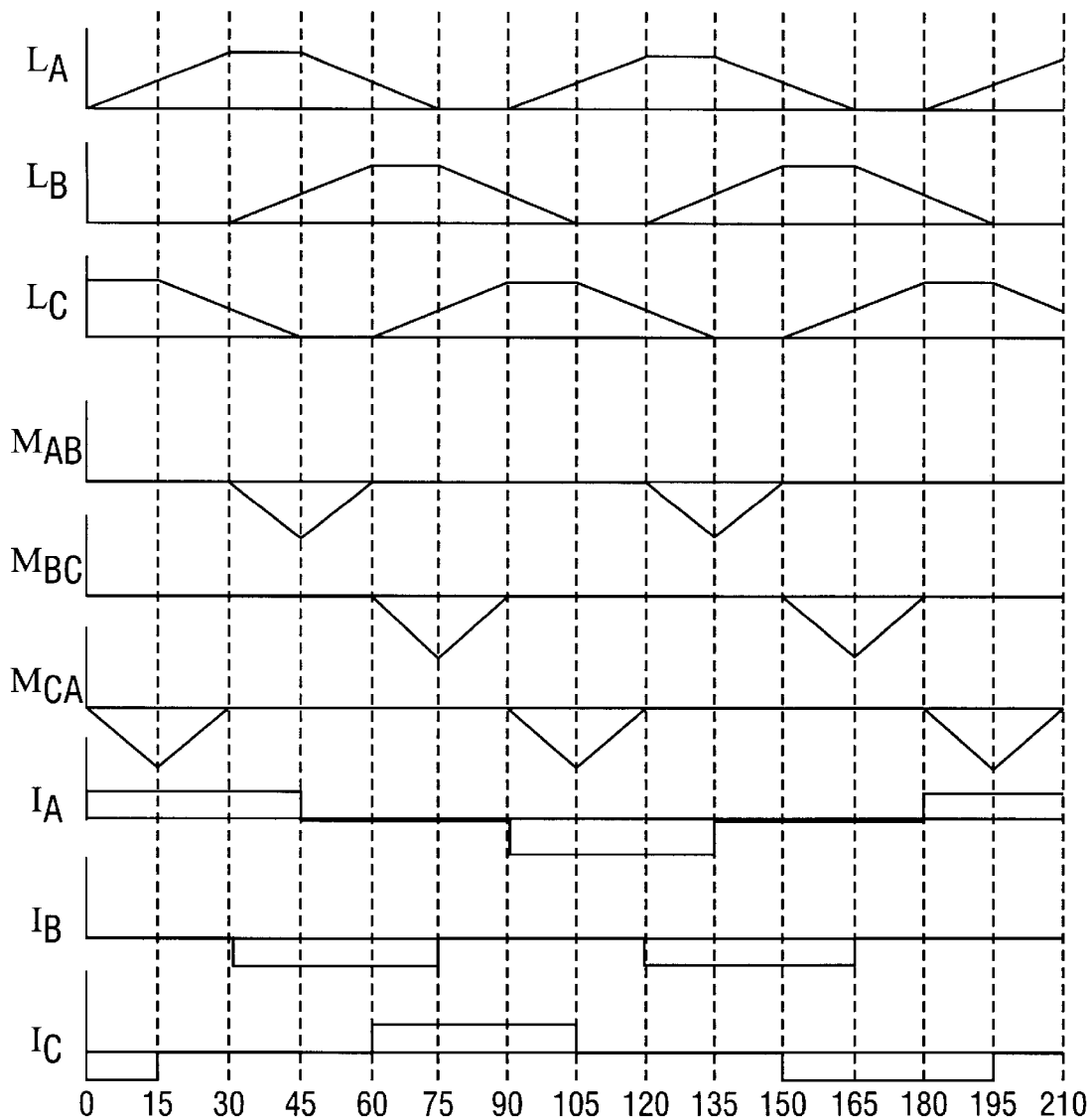
FIG. 9 illustrates wave forms for self-inductance, mutual inductance and current in phases A, B and C of a 6/4 3-phase switched reluctance machine constructed in accordance with the present invention using bipolar phase excitation current.

A short flux path can be established for each machine phase by using a bi-polar phase excitation scheme as illustrated in FIG. 9. As the current wave forms of FIG. 9 show (beginning at the 15° point), the polarity of the phase excitation current for each phase alternates between positive and negative according to the following sequence: A+, A+B−, B−, B−C+, C+, C+A−, A− . . . Thus, whenever adjacent phases are simultaneously energized, opposite-polarity current is applied to each phase windings to establish the short flux path, thereby increasing the positive mutual inductance torque element.

Figure 10:
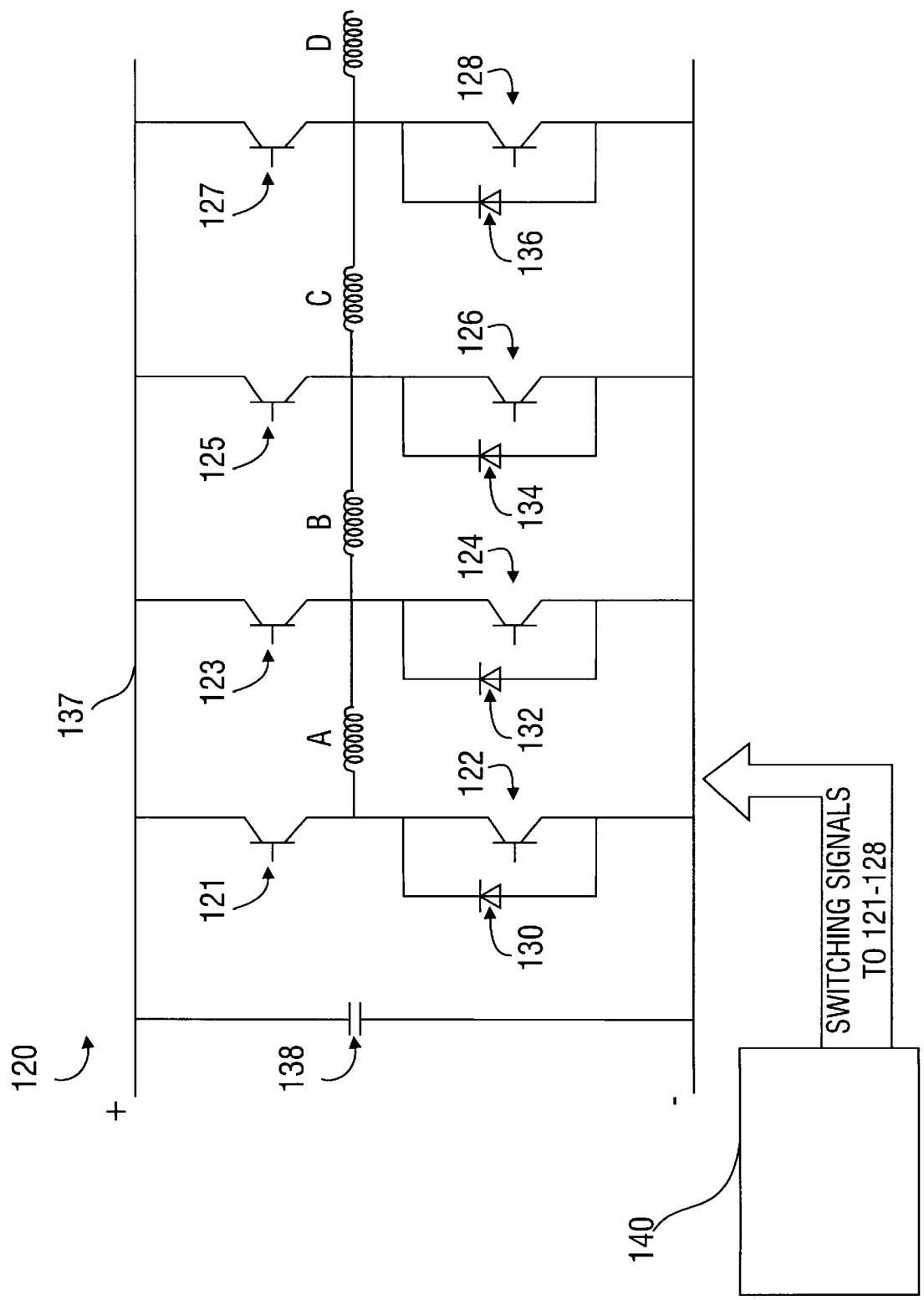
FIG. 10 illustrates a circuit diagram of an exemplary power converter which may be used to provide bipolar phase energization to the machine of the present invention.

An embodiment of a control circuit for providing the above described phase excitation pattern for a three phase machine is illustrated in FIG. 10. The circuit of FIG. 10 includes three phase windings A, B and C with eight power switching devices 121–128. Power switching devices 122, 124, 126 and 128 each have a diode 130, 132, 134 and 136, respectively, coupled in parallel therewith. As with the circuit of FIG. 5, the DC bus 137 is established across a DC capacitor 138. A switching circuit 140 is provided for detecting the position of the rotor with respect to the stator and energizing the phase windings A, B, C as a function of the rotor's position in accordance with the sequence described above.

For example, the current wave forms illustrated in FIG. 9 show phase A energized with positive current at the 15° point. Thus, the switching circuit 140 for the control circuit 120 provides signals to turn on switches 121 and 124, establishing a current path from the positive rail of the DC bus 137 through switch 121, through the phase A winding, and to the negative rail of the DC bus 137 through switch 124. When the machine rotor poles 32a and 32c (referring to FIG. 3) align with the phase A stator pole pair 36A, current opposite in polarity to that applied to the phase A winding is simultaneously applied to the phase B windings about stator pole pair 36B. To accomplish this, the switching circuit 140 provides signals to additionally turn on switch 125, establishing a second current path from the positive rail of the DC bus 137 through switch 125, through the phase B winding, and through switch 124 to the negative rail of the DC bus 137. Thus, the current flows through the phase B winding in the opposite direction to the phase A current.

When the rotor poles 32a and 32c move past the fully aligned position (the 45° position in FIG. 9), current is removed from the phase A winding by opening switch 121, leaving only phase B energized through switches 125 and 124. The phase A winding has a discharge path through switch 124 and diode 130. When the rotor poles fully align with the phase B stator poles, positive current is simultaneously applied to the phase C winding by additionally closing switch 128, establishing a second current path from the positive rail of the DC bus, through switch 125, through the phase C winding, and through switch 128 to the negative rail. Table 1 illustrates the proper "on" states for switches 121–128 to achieve the phase energization sequence described above.

TABLE 1

| ON state | Phase and current polarity |
| --- | --- |
| 121, 124 | A+ |
| 121, 124, 125 | A+ B− |
| 124, 125, | B− |
| 124, 125, 128 | B− C+ |
| 125, 128, | C+ |
| 122, 123, 125, 128 | C+ A− |
| 122, 123 | A− |
| 122, 123, 126 | A− B+ |
| 123, 126 | B+ |
| 123, 126, 127 | B+ C− |
| 126, 127 | C− |
| 121, 124, 126, 127 | C− A+ |

Figure 11:
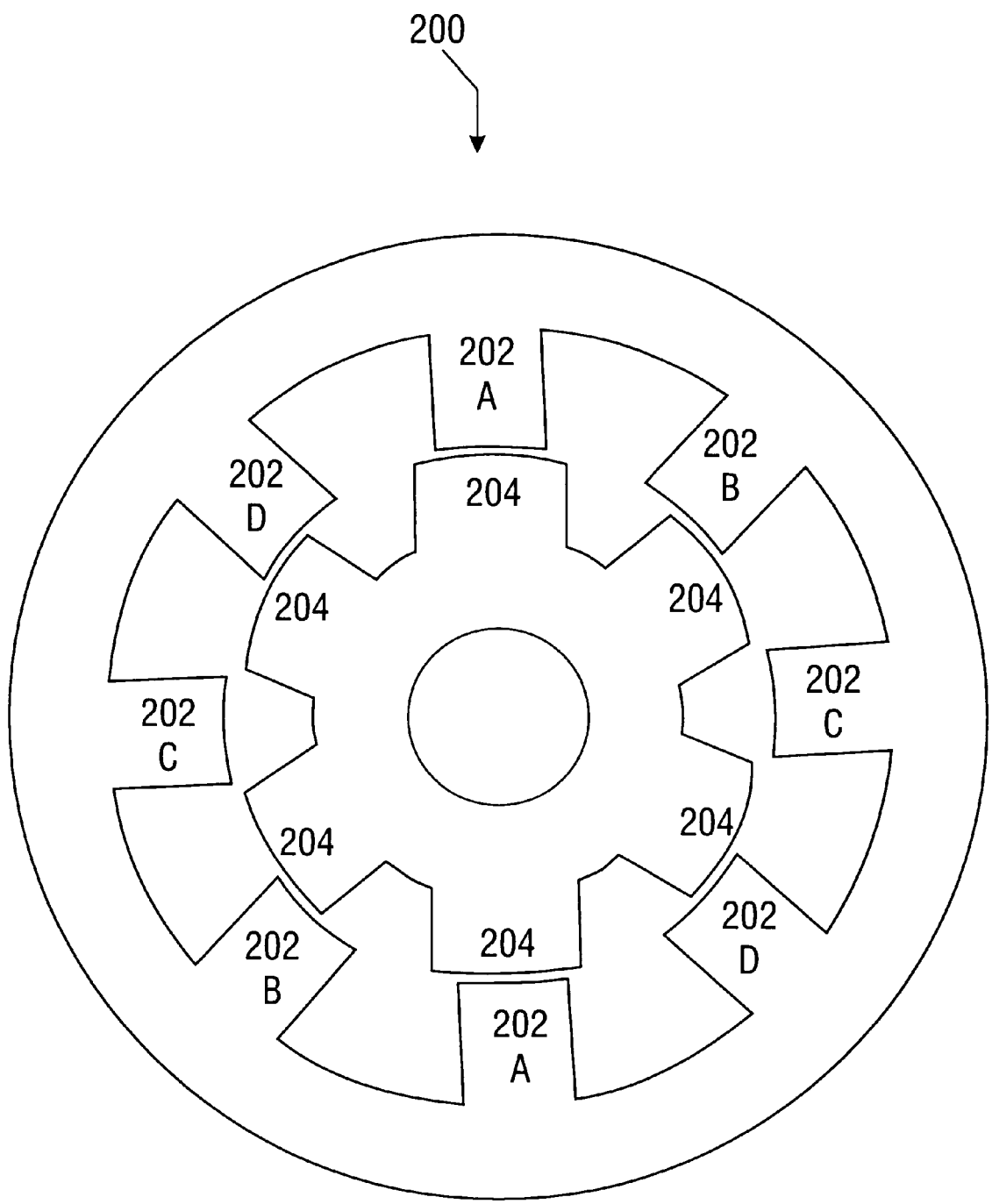
FIG. 11 illustrates a 8/6 4-phase switched reluctance machine constructed according to certain aspects of the present invention, having rotor poles which are wider than the stator poles.

An alternate embodiment of a switched reluctance machine 200 having four phases with eight stator poles 202 and six rotor poles 204 is illustrated in FIG. 11. In a machine 200 such as illustrated in FIG. 11, each stator pole defines an arc which is approximately 1.5 times larger than each rotor pole. In the machine 200 of FIG. 11, each stator pole defines approximately a 22.5° arc, and each rotor pole defines approximately a 33.75° arc. For purposes of illustration, the stator poles are divided into four stator pole pairs 202A, 202B, 202C and 202D, with each stator pole pair comprising two opposing stator poles. Wound about the stator poles 202 are four phase windings (not shown).

Figure 12:
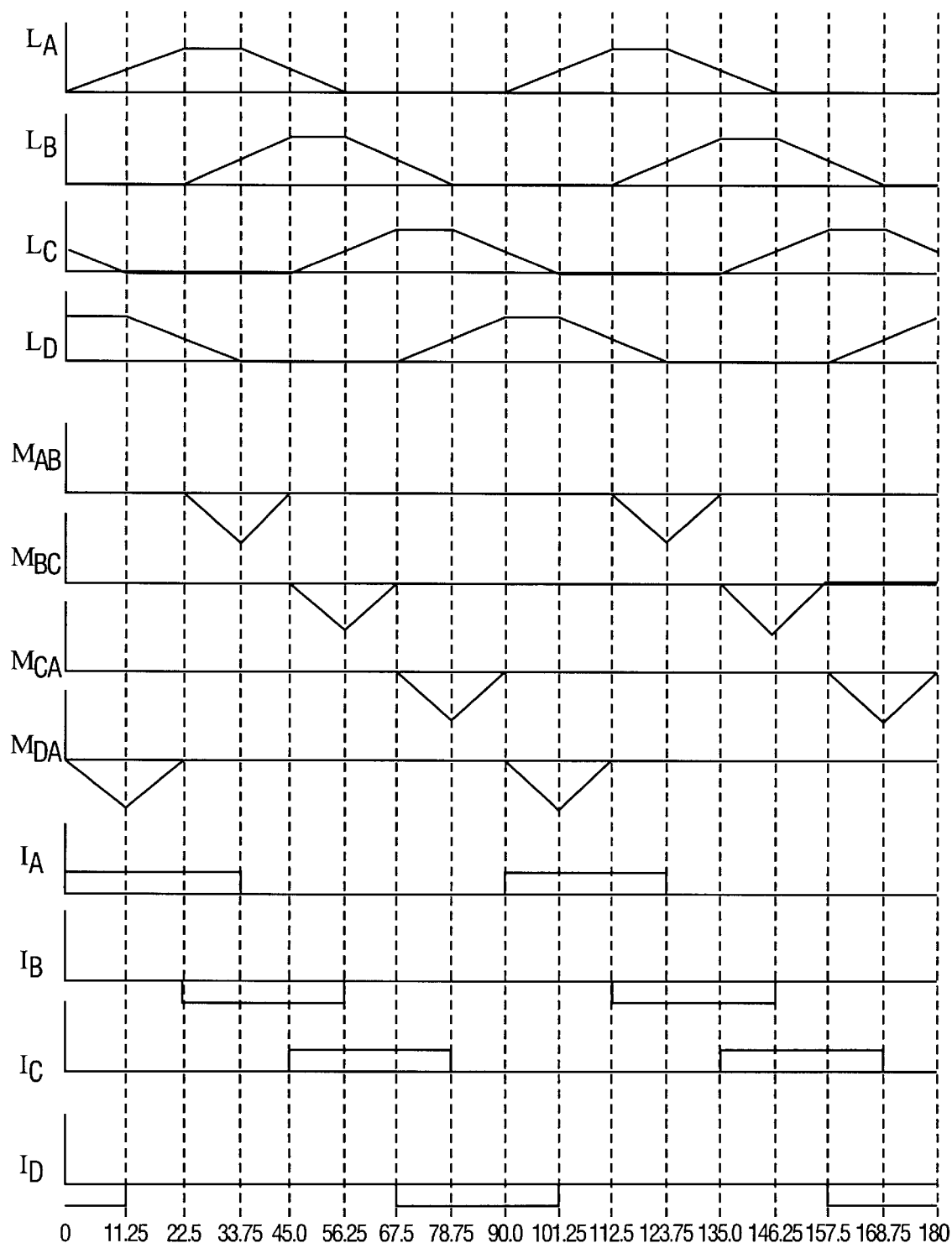
FIG. 12 illustrates wave forms for self-inductance, mutual inductance and current in phases A, B, C and D of a 8/6 4-phase switched reluctance machine constructed in accordance with the present invention.

The four phase embodiment of the invention pictured in FIG. 11 operates similarly to the three phase embodiment disclosed above. In the exemplary four phase is machine 200, alternate phases are energized with current of opposite polarity, For example, positive current may be applied to phases A and C, with negative current applied to phases B and D. A control circuit similar to the circuit illustrated in FIG. 5, with the addition of an additional phase winding and corresponding power switching devices and anti-parallel devices may be used to provide energization current to the phase windings. The phase windings for phases A and C are coupled to the DC bus opposite to the phase B and D windings. The phase windings for a wide-pole switched reluctance machine such as that pictured in FIG. 11 may be energized according to the following sequence: A+, A+B−, B−, B−C+, C+, C+D−, D−, D−A+, A+ . . . Self inductance, mutual inductance and current wave forms for the exemplary four phase machine energized in this manner are illustrated in FIG. 12. Thus, a "short" flux path is established using a simple control circuit.

The use of mutual inductance to generate torque, which is facilitated by the exemplary wide pole design, creates several benefits. Since current may be applied to more than one phase winding simultaneously without a negative torque penalty, torque ripple is greatly reduced. Further, energizing multiple phases at the same time balances the magnetic forces within the machine. This results in less deformation of the rotor and stator poles, which reduces the noise level of the machine.

Copper loss occurs when current flows through a phase winding, because the current flowing through the winding generates heat. With the embodiment of the present invention, two phases are simultaneously excited, resulting in additional current flowing and in turn, additional copper loss. However, this is more than offset by the additional torque created by the mutual inductance. Moreover, the fabrication of this improved machine is possible without any significant change to current manufacturing utilities and drives.

In the embodiments described above in association with FIG. 3 and FIG. 11, the rotor pole arc is 1.5 times greater than the stator pole arc. Such a machine is useful in both low speed and high speed operations, although alternative constructions are envisioned. For example, if the rotor pole is increased such that the arc defined thereby is 2 times the arc defined by the stator pole (rotor pole arc=60° and stator pole arc=30° in a three-phase 6/4 machine), the machine will be such that two phases are always conducting. A machine having this rotor pole configuration is particularly suited for reducing noise in low speed applications.

Figure 13:
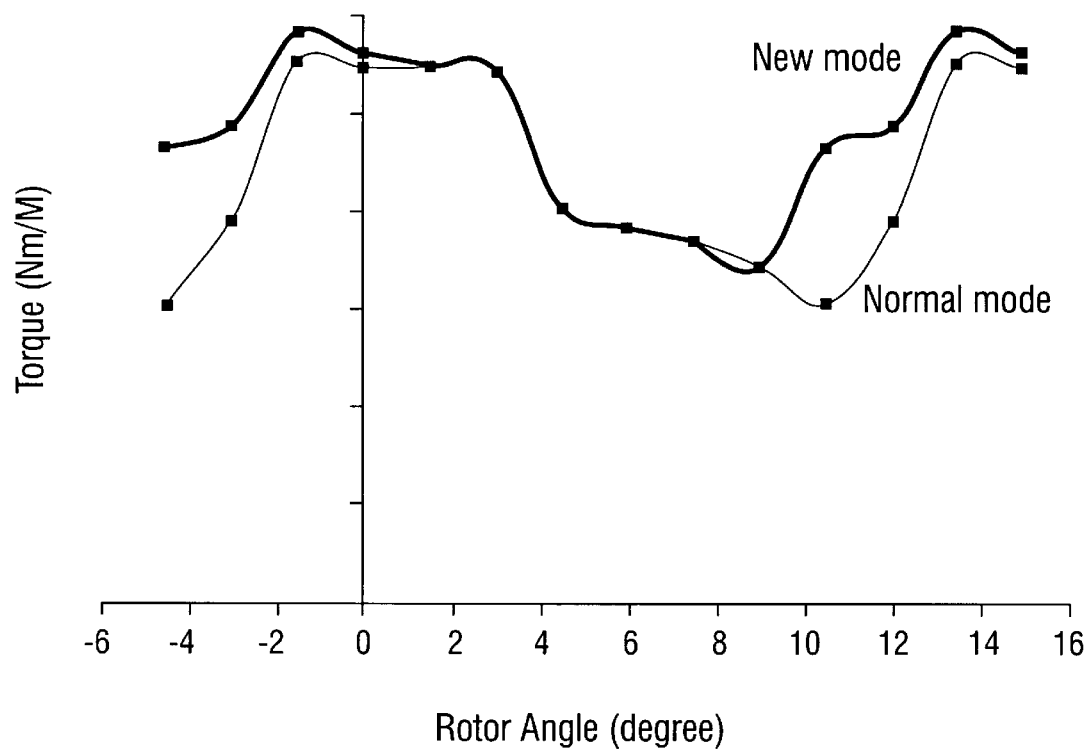
FIG. 13 compares torque production as a function of rotor position for both a traditional switched reluctance machine and a wide pole machine constructed according to certain aspects of the present invention.
Figure 14:
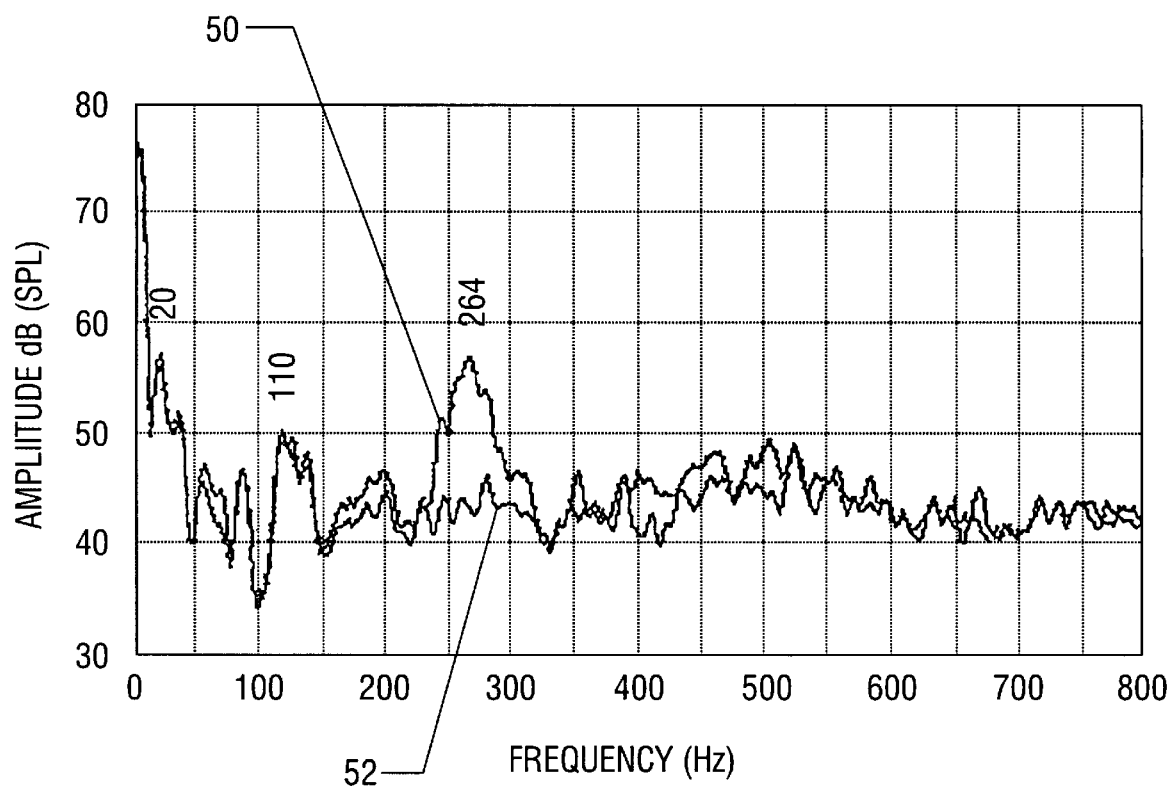
FIG. 14 compares noise level measurements for both a traditional switched reluctance machine and a wide pole machine constructed according to certain aspects of the present invention.

FIG. 13 compares the torque acting on the rotor as a function of the rotor angle for a conventional switched reluctance machine and an embodiment of the present invention having rotor poles that are wider than the stator poles. At almost every rotor position, the torque production of the novel design described herein matches or exceeds that of a conventional machine. FIG. 14 shows measurements of noise produced by a conventional production style machine, curve 50, and the novel machine described herein, curve 52. As shown, the machine described herein produces less noise at most frequencies.

The above description of several exemplary embodiments is made by way of example and not for purposes of limitation. Many variations may be made to the embodiments and methods disclosed herein without departing from the scope and spirit of the present invention. For example, the present invention was discussed primarily in the context of a three phase switched reluctance machines having six stator poles and four rotor poles. Alternate stator pole/rotor pole combinations (e.g., 12/8, 8/4, 6/8, etc.) are envisioned, and one skilled in the art with the benefit of this disclosure could apply the invention to other switched reluctance machine configurations such as these. Further, one skilled in the art having the benefit of this disclosure could apply the principles disclosed herein to various configurations of a four-phase motor. The present invention is intended to be limited only by the scope and spirit of the following claims.

What is claimed is:

1. A reluctance machine comprising:
    a stator defining a plurality of stator poles, each stator pole defining an arc;
    a rotor defining a plurality of rotor poles, each rotor pole defining an arc which is larger than each of the stator pole arcs, the rotor being mounted for rotation with respect to the stator;
    a plurality of phase windings; and
    a controller for selectively energizing and de-energizing the phase windings, such that during a first angular period, a given stator pole is excited and stator poles adjacent the given stator pole are not excited; and during a second angular period, the given stator pole and a stator pole adjacent the given stator pole are simultaneously excited.

2. The reluctance machine of claim 1, wherein each rotor pole arc is 1.5 times larger than each stator pole arc.

3. The reluctance machine of claim 1, wherein each rotor pole arc is 2 times larger than each stator pole arc.

4. The reluctance machine of claim 1, wherein the plurality of phase windings comprises three phase windings.

5. The reluctance machine of claim 4, wherein the three phase windings comprise first, second and third phase windings, and wherein the controller energizes the first and third phase windings with current of a given polarity and the controller energizes the second phase winding with current of a polarity opposite the given polarity.

6. The reluctance machine of claim 4, wherein the stator has 6 stator poles and the rotor has 4 rotor poles.

7. The reluctance machine of claim 4, wherein the stator has 12 stator poles and the rotor has 8 rotor poles.

8. The reluctance machine of claim 1, wherein the plurality of phase windings comprises four phase windings.

9. The reluctance machine of claim 8, wherein the four phase windings comprise first, second, third and fourth phase windings, and wherein the controller energizes the first and third phase windings with current of a given polarity and the controller energizes the second and fourth phase windings with current of a polarity opposite the given polarity.

10. The reluctance machine of claim 1 wherein
    the reluctance machine defines a plurality of self inductance profiles corresponding to the plurality of phases, each self inductance profile including a period of increasing inductance, a period of substantially constant inductance, and a period of decreasing inductance; and
    the controller energizes the phase windings such that when the self inductance profile for one of the phase windings is in the period of substantially constant inductance, a second phase winding is simultaneously energized and in the period of increasing inductance.

11. The reluctance machine of claim 1, wherein the controller energizes one phase winding with current having a first polarity, and energizes an adjacent phase winding with current having a polarity opposite the first polarity.

12. The method of claim 11 further comprising the act of de-energizing the second one of the phase windings at a fourth angular position which is defined by the second angular position plus the angular interval equal to the rotor pole arc.

13. The method of claim 11 wherein the act of energizing a second one of the phase windings comprises energizing the second one of the phase windings with current of a polarity opposite the polarity of the current which energized the first one of the phase windings.

14. A method of energizing a reluctance machine having a stator defining a plurality of stator poles, each stator pole defining an arc; a rotor defining a plurality of rotor poles, each rotor pole defining an arc which is larger than each of the stator pole arcs; and a plurality of phase windings, each phase winding including a plurality of winding coils surrounding the stator poles, the method comprising the acts of:
    energizing a first one of the phase windings at a first angular position to excite a given stator pole;
    energizing a second one of the phase windings at a second angular position which is defined by the first angular position plus an angular interval equal to the stator pole arc to simultaneously excite a stator pole adjacent the given stator pole; and
    de-energizing the first one of the phase windings at a third angular position which is defined by the first angular position plus an angular interval equal to the rotor pole arc.

15. A reluctance machine comprising:
    a stator defining a plurality of stator poles, each stator pole defining an arc;
    a rotor defining a plurality of rotor poles, each rotor pole defining an arc which is larger than each of the stator pole arcs;
    a plurality of phases, each phase including a plurality of winding coils surrounding the stator poles,
    a controller for selectively energizing and de-energizing the winding coils, wherein a first one of the phases is energized to energize a given stator pole, a second one of the phases is energized when a given rotor pole completely aligns with the given stator pole to excite a stator pore adjacent the given stator pole, and the first phase is de-energized when the given rotor pole disaligns with the given stator pole.

16. The reluctance machine of claim 15 wherein the controller energizes the first phase with current of a given polarity, and the controller energizes the second phase with current of a polarity opposite the given polarity.

17. The reluctance machine of claim 15 wherein the controller energizes and de-energizes the phase windings in a manner such that mutual coupling is established between adjacent phases.

18. The reluctance machine of claim 17 wherein the controller energizes the phase windings with bi-polar current.

19. A switched reluctance machine comprising:
    a stator defining a plurality of stator poles, each stator pole defining an arc;

a rotor defining a plurality of rotor poles, each rotor pole defining an arc which is larger than each of the stator pole arcs, the rotor being mounted for rotation with respect to the stator;

a plurality of phase windings, each phase winding including at least one winding coil;

a controller for selectively energizing and de-energizing the phase windings, wherein the controller energizes a single phase winding with current having a first polarity during a first period, and simultaneously energizes an adjacent phase winding with current having a polarity opposite the first polarity during a second period.

20. The reluctance machine of claim 19, wherein each rotor pole arc is 1.5 times larger than each stator pole arc.

21. The reluctance machine of claim 19, wherein each rotor pole arc is 2 times larger than each stator pole arc.

22. The reluctance machine of claim 19 wherein the plurality of phase windings comprises three phase windings.

23. The reluctance machine of claim 19 wherein the plurality of phase windings comprises four phase windings.

24. A switched reluctance machine system comprising a switched reluctance machine including a stator defining a plurality of stator poles, each stator pole defining an arc; a rotor defining a plurality of rotor poles, each rotor pole defining an arc which is larger than each of the stator pole arcs, the rotor being mounted for rotation with respect to the stator; and a plurality of phase windings;

the switched reluctance machine defining a plurality of self inductance profiles corresponding to the plurality of phases and a plurality of mutual inductance profiles, each self inductance profile including a period of increasing inductance, a period of substantially constant inductance, and a period of decreasing inductance; and a controller for energizing the phase windings, such that when the self inductance profile for one of the phase windings is in the period of substantially constant inductance, a second phase winding is simultaneously energized and in the period of increasing inductance.

* * * * *

UNITED STATES PATENT AND TRADEMARK OFFICE
CERTIFICATE OF CORRECTION

PATENT NO.    :   5,936,373
DATED         :   August 10, 1999
INVENTOR(S)   :   Yue Li and James Skinner It is certified that error appears in the above-identified patent and that said Letters Patent is hereby corrected as shown below:

On the title page under [73] Assignee, please correct the state from "Mich." to "MO" – therefor.

Signed and Sealed this

Seventh Day of December, 1999

Attest:

Q. TODD DICKINSON

*Attesting Officer*   *Acting Commissioner of Patents and Trademarks*